(12) United States Patent
Eberle

(10) Patent No.: US 6,912,927 B2
(45) Date of Patent: Jul. 5, 2005

(54) MODULAR-FLEXIBLE WORMSHAFT ASSEMBLY

(75) Inventor: Frederick Paul Eberle, Simpsonville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 47 days.

(21) Appl. No.: 10/146,097

(22) Filed: May 15, 2002

(65) Prior Publication Data

US 2003/0213324 A1 Nov. 20, 2003

(51) Int. Cl.[7] .................................................. F16H 1/16
(52) U.S. Cl. .......................... 74/425; 403/303; 464/182
(58) Field of Search ............................... 74/425, 421 A, 74/606 R, 416; 403/179, 300, 303, 305; 464/182

(56) References Cited

U.S. PATENT DOCUMENTS

| | | | | |
|---|---|---|---|---|
| 4,020,715 A | * | 5/1977 | Sollars ...................... 74/606 R |
| 4,271,909 A | * | 6/1981 | Chatfield et al. .............. 169/70 |
| 4,277,181 A | * | 7/1981 | Stahly et al. ................. 366/69 |
| 4,841,793 A | * | 6/1989 | Leigh-Monstevens et al. ............................ 74/335 |
| 5,056,265 A | * | 10/1991 | Hurst ........................... 451/69 |
| 5,553,966 A | | 9/1996 | Morelli et al. .............. 403/355 |
| 5,688,070 A | | 11/1997 | Morelli et al. .............. 403/356 |
| 5,816,116 A | * | 10/1998 | Antony et al. ............ 74/606 R |
| 6,029,532 A | * | 2/2000 | Phillips .................... 74/421 R |
| 6,032,550 A | * | 3/2000 | Rugh .......................... 74/425 |
| 6,218,746 B1 | * | 4/2001 | Gouge, Jr. ................... 310/50 |
| 2003/0047018 A1 | * | 3/2003 | Leibold ..................... 74/424.5 |
| 2003/0225411 A1 | * | 12/2003 | Miller ......................... 606/80 |

OTHER PUBLICATIONS

Textron Power Transmission, loose-leaf catalog dated Sep. 2001.

* cited by examiner

Primary Examiner—David M. Fenstermacher
(74) Attorney, Agent, or Firm—Patrick S. Yoder; Alexander M. Gerasimow

(57) ABSTRACT

A worm shaft is provided with an intermediate worm thread section between first and second end structures, wherein at least one of the first and second end structures has a coupling structure for a desired extension of a plurality of modular worm shaft extensions. The desired extension and the intermediate worm thread section are both selectable based on the desired application, the desired gearing ratio, and other features. Accordingly, the multi-component worm shaft of the present technique increases flexibility, reduces manufacturing costs, and reduces inventory.

41 Claims, 5 Drawing Sheets

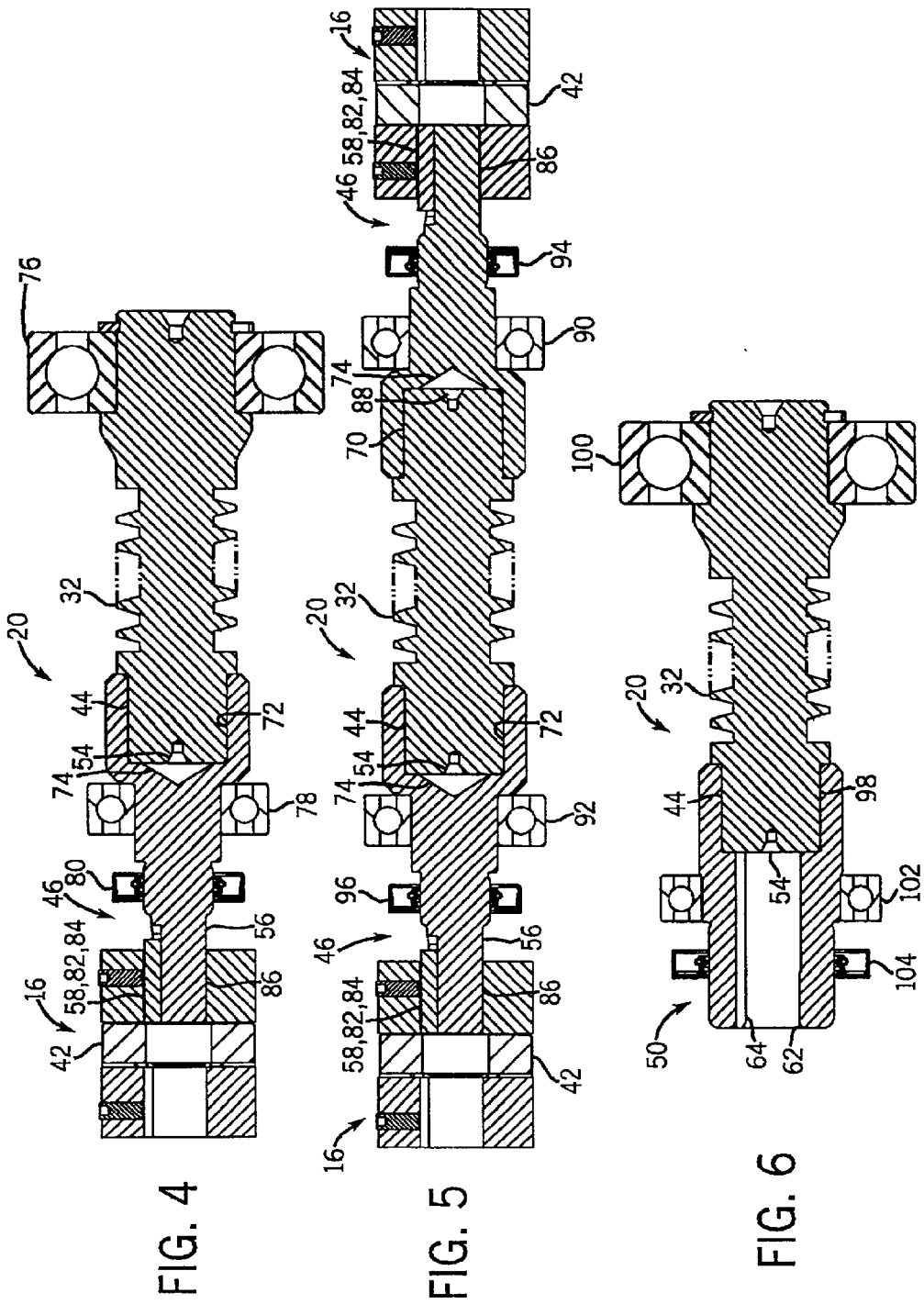

MODULAR-FLEXIBLE WORMSHAFT ASSEMBLY

BACKGROUND OF THE INVENTION

The present technique relates generally to systems having one or more gears, such as a worm shaft and associated gear. The present technique provides a modular worm shaft assembly having a worm thread section and an attachable modular extension, which may be selected from a plurality of attachable extensions.

In conventional systems, the worm shaft is a one-piece or integral structure having a desired gearing ratio and end structure. This one-piece design results in a relatively high number of different worm shafts, because different systems generally require different end structures and gearing ratios. Accordingly, a need exists for a more standardized worm shaft to reduce manufacturing costs, to reduce costly inventories, and to provide more flexibility between the different systems using worm shaft and gear assemblies.

SUMMARY OF THE INVENTION

A worm shaft is provided with an intermediate worm thread section between first and second end structures, wherein at least one of the first and second end structures has a coupling structure for a desired extension of a plurality of modular worm shaft extensions. The desired extension and the intermediate worm thread section are both selectable based on the desired application, the desired gearing ratio, and other features. Accordingly, the multi-component worm shaft of the present technique increases flexibility, reduces manufacturing costs, and reduces inventory.

BRIEF DESCRIPTION OF THE DRAWINGS

The foregoing and other advantages and features of the invention will become apparent upon reading the following detailed description and upon reference to the drawings in which:

FIG. 4 is a cross-sectional view of the multi-component worm shaft having a male extension coupled to the attachment end of the worm thread section;

FIG. 5 is a cross-sectional view of the multi-component worm shaft having male extensions coupled to both ends of the worm thread section;

FIG. 6 is a cross-sectional view of the multi-component worm shaft having a female extension coupled to the attachment end of the worm thread section.

DETAILED DESCRIPTION OF SPECIFIC EMBODIMENTS

The present invention provides a modular assembly technique, which is particularly advantageous for worm shafts and other shafts having a variety of end structures and/or central structures. As noted above, worm shafts may have a wide variety of gearing characteristics and end structures, such as male coupling ends, female coupling ends, and gear ends. The present technique separates the worm shaft manufacturing process into a modular extension manufacturing process, a worm thread section manufacturing process, and an assembly process to form a desired worm shaft using the desired modular extension and the desired worm thread section.

Figure 1:
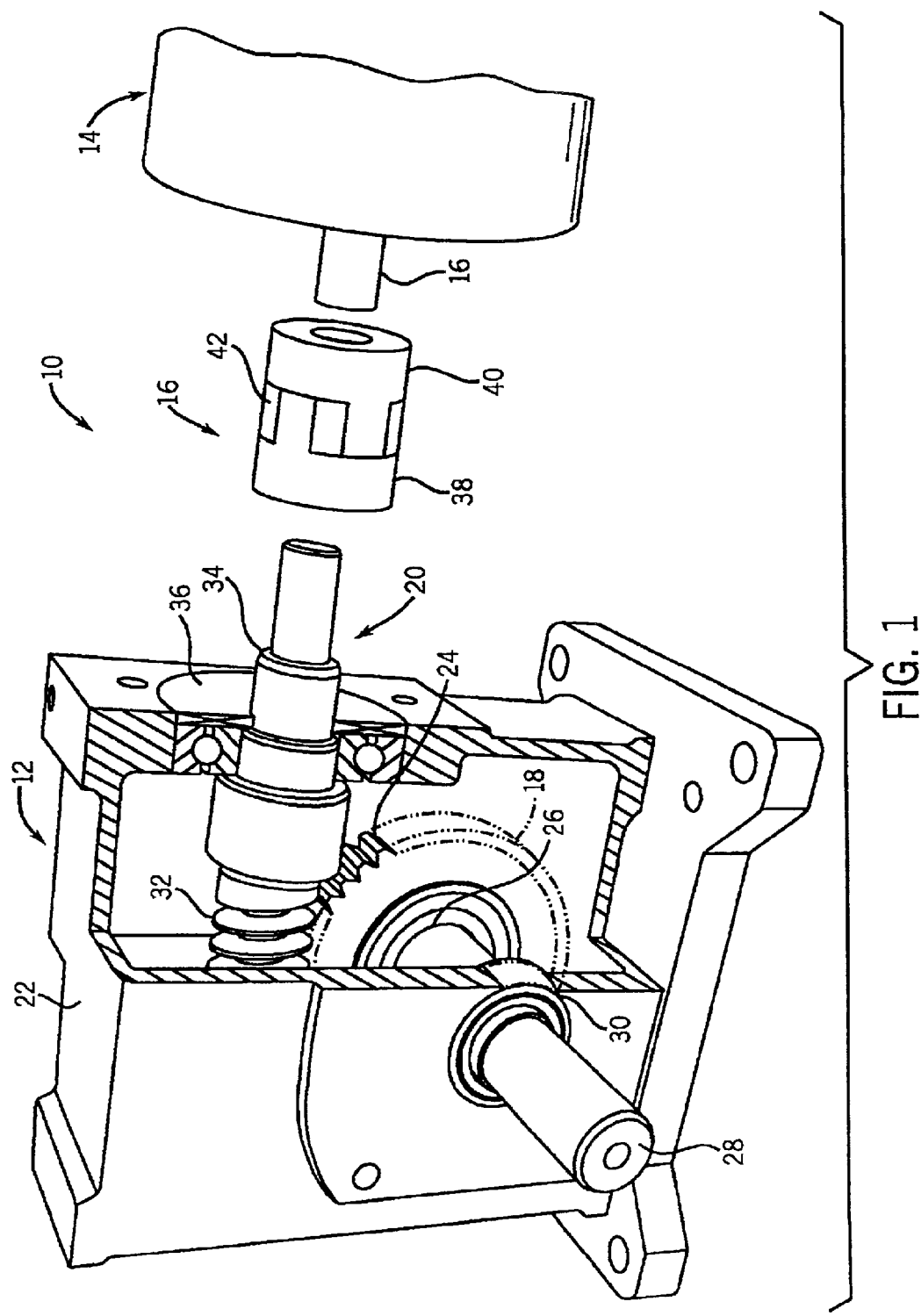
FIG. 1 is a perspective view of an exemplary system having a multi-component worm shaft and worm gear of the present technique.

FIG. 1 is an exploded perspective view of an exemplary system 10 having a device 12 exploded from a motor 14, which is drivingly coupleable with the device 12 via a coupling 16. The device 12 may be a gear box, an industrial machine, or any other desired machinery. The motor 14 may be any suitable electrical motor or combustion engine, such as an internal combustion engine or a gas turbine engine.

In the illustrated system 10, the device 12 has a worm gear 18 engaged with a multi-component worm shaft 20 inside a casing 22. The worm gear 18 has a plurality of gear teeth 24 encircling an outer perimeter of the worm gear 18, while a central portion 26 of the worm gear 18 has a shaft 28 extending outwardly from the worm gear 18. In the illustrated embodiment, the shaft 28 extends rotatably through the casing 22 via bearing 30. The external end of the shaft 28 may then be coupled to a desired device. The multi-component worm shaft 20 has a thread section 32 coupled to an modular extension 34 both of which are selectable from a plurality of modular components having different dimensions and characteristics, which may be desirable for a particular application. In the illustrated embodiment, the modular extension 34 extends rotatably through the casing 22 via bearing 36.

The multi-component worm shaft 20 is then coupled to the motor 14 via the coupling 16, which has a coupling section 38 for the modular extension 34 and a coupling section 40 for the motor shaft 16. As illustrated, the coupling 16 also has a flexible structure 42, such as rubber, to stabilize the mechanical coupling between the device 12 and the motor 14. Although specific components are illustrated in FIG. 1, the multi-component worm shaft 20 may be disposed in any suitable device or system. Moreover, the multi-component worm shaft 20 may be assembled from different thread sections 32 and different modular extensions 34 in each different application.

Figure 2:
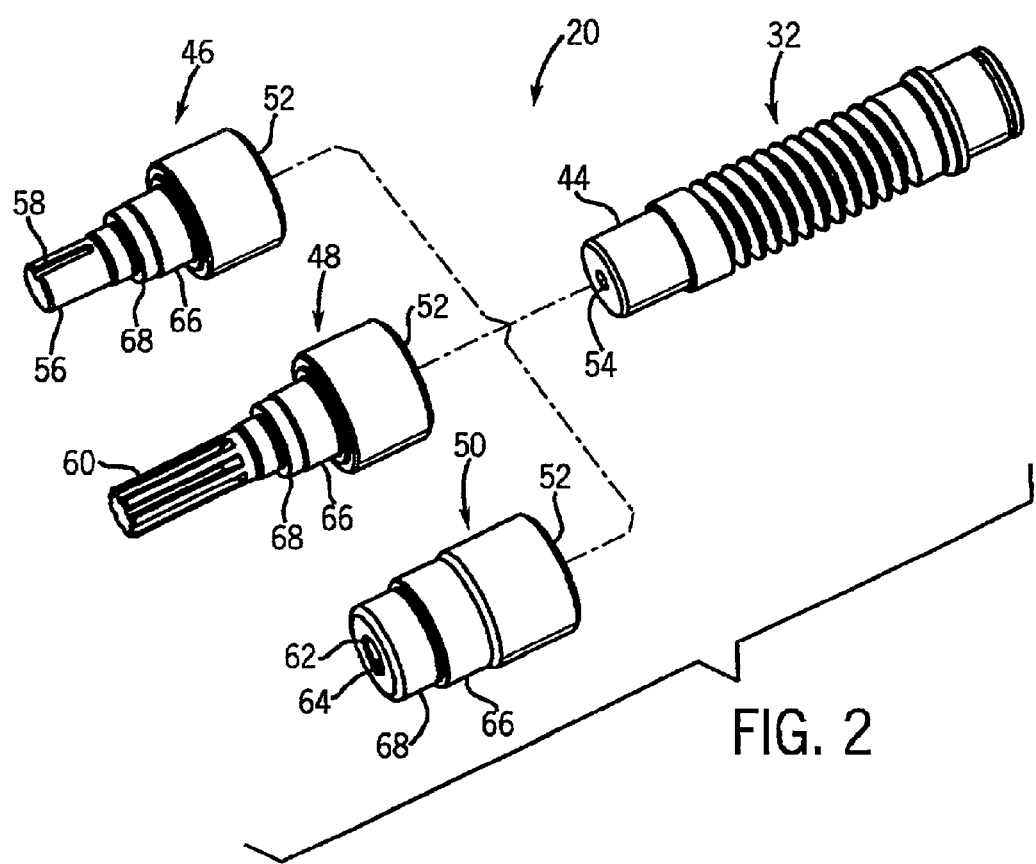
FIG. 2 is a perspective view of the multi-component worm shaft having a variety of modular extensions exploded from an attachment end of a worm thread section of the multi-component worm shaft.

FIG. 2 is a perspective view of the multi-component worm shaft 20 illustrating a plurality of modular extension structures exploded from a modular assembly end 44 of the thread section 32. In this exemplary embodiment, the thread section 32 may be assembled with one of modular extension structures 46, 48, and 50 via mating assembly ends 52. The mating assembly ends 52 of the modular extension structures 46, 48, and 50 are selectively coupleable with the modular assembly end 44 of the thread section 32 via any suitable attachment mechanism, such as a press fit, an interference fit, a slot and key interlock mechanism, a threaded fastener, a shrink fit, or any permanent or removable coupling mechanism. For example, a desired one of the modular extension structures 46, 48, and 50 may be heated, engaged with the modular assembly end 44, and cooled to shrink the desired modular extension end about the modular assembly end 44. In this exemplary embodiment, the thread section 32 also has a cavity 54 in the modular assembly end 44 to accommodate air that may be trapped during an assembly process, such as a press fit or interference fit assembly process. The cavity 54 has a size and structure to reduce pressure buildup both during the assembly process and during subsequent use, such as where heat variations cause pressure variations in the trapped air. In operation, the cavity 54 renders the trapped air innocuous to the design and function of the multi-component worm shaft 20.

As mentioned above, each of the various modular extension structures 46, 48, and 50 may have different dimensions and structures, such as coupling structures, gear structures, and integrated component structures. For example, one of the modular extension structures 46, 48, and 50 may comprise a motor adapter, a mounting adapter, a secondary gearbox structure, or any other desired mechanical component. In the illustrated embodiment of FIG. 2, the modular extension structure 46 has a male coupling structure 56 with a key slot 58 to interlock the male coupling structure 56 with a female coupling structure via a key member. The modular extension structure 48 has a gearing structure 60, which may be a spline or any other desired gearing mechanism. The modular extension structure 50 has a female coupling structure 62 with a key slot 64 to interlock the female coupling structure 62 with a male coupling structure via a key member. Any other coupling structure is also within the scope of the present technique. For example, the foregoing male and female coupling structures 56 and 62 may comprise a press-fit mechanism, an interference-fit mechanism, a fastener, threads, a socket, or any other suitable coupling mechanism. The modular extension ends 46, 48, and 50 also may have one or more bearing surfaces and/or seal surfaces, such as bearing surfaces 66 and seal surfaces 68.

Figure 3:
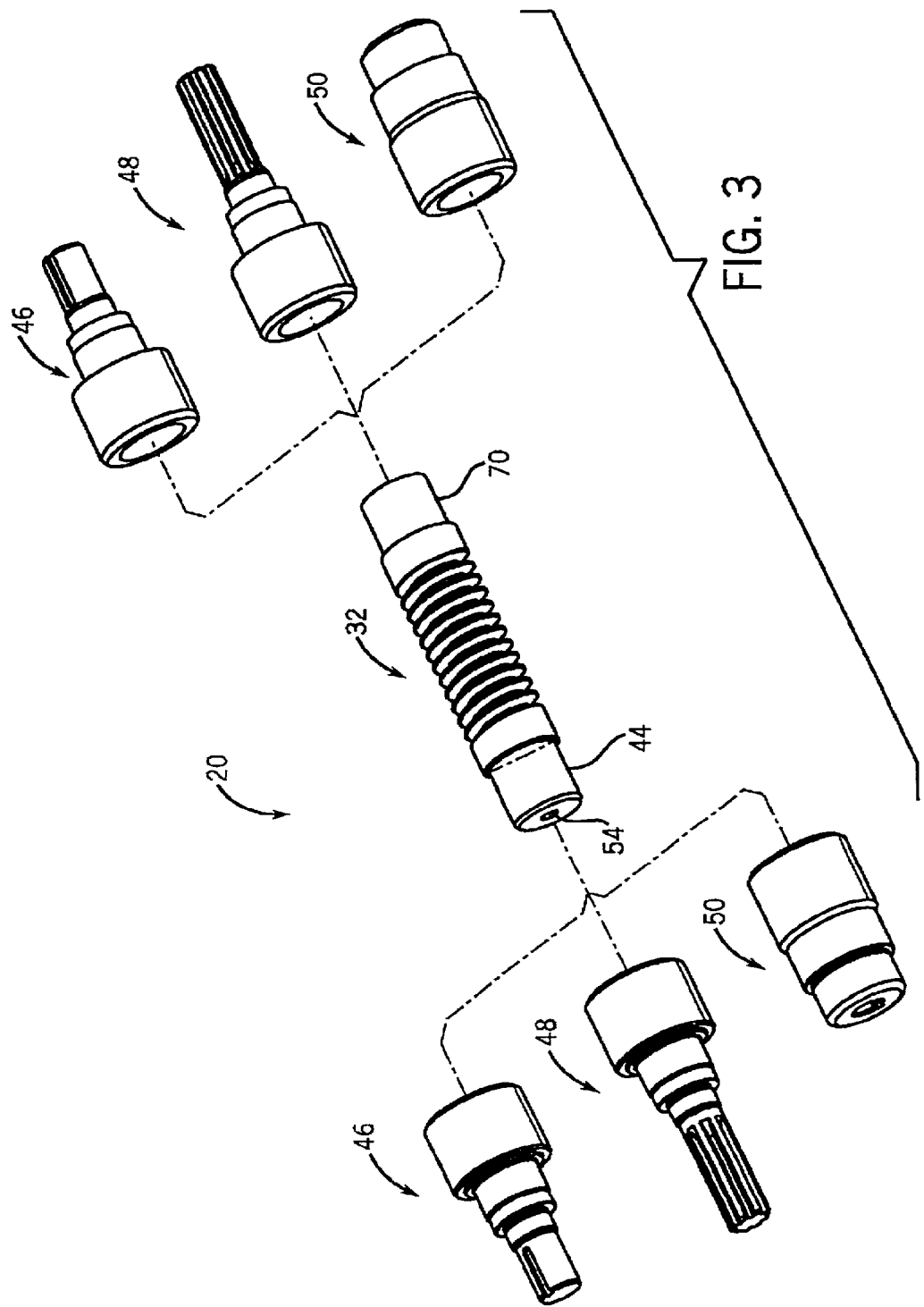
FIG. 3 is a perspective view of the multi-component worm shaft having a variety of modular extensions exploded from both ends of the worm thread section.

If modularity is desired at both ends of the multi-component worm shaft 20, then the present technique may provide the thread section 32 with a modular assembly end 70 opposite the modular assembly end 44, as illustrated by FIG. 3. The multi-component worm shaft 20 illustrated in FIG. 3 has the modular extension structures 46, 48, and 50 exploded from both modular assembly ends 44 and 70 of the thread section 32. Again, the modular extension structures 46, 48, and 50 may have any suitable structure and dimensions for a desired application. Moreover, identical or different modular extension structures may be assembled with the modular assembly ends 44 and 70 via any suitable assembly process, such as a press fit process, a shrink fit process, an adhesive process, or any other suitable permanent or removable coupling mechanism. Accordingly, the ability to select a particular thread section 32 and one or two modular extension structures for the thread section 32 provides a degree of flexibility, which is particularly useful to devices and systems using worm shafts. For example, if a removable coupling mechanism is used for one or both of the modular extension structures, then the multi-component worm shaft 20 can be adapted to any device or system along with changes in the particular device or system.

FIGS. 4–6 are cross-sectional views of the multi-component worm shaft 20 having various modular extension structures coupled to one or both of the modular assembly ends 44 and 70. The multi-component worm shaft 20 illustrated by FIG. 4 has the modular extension structure 46 coupled to the modular assembly end 44 of the thread section 32. The foregoing coupling may be achieved by placing a female portion 72 of the modular extension structure 46 about the modular assembly end 44 in an interference fit, such as by pressing or shrink-fitting the modular extension end 46 onto the modular assembly end 44. The degree of interference, or tightness of the fit, also may be varied to accommodate the torsional requirements of a particular application. If additional support is necessary to supplement the interference fit, then the present technique may provide a suitable fastener (e.g., a slot and key, a bolt or pin through the connection, etc.) to secure the interference fit. Moreover, the thread section 32 has the cavity 54 to accommodate air trapped between the female portion 72 and the modular assembly end 44 during the coupling process. The modular extension end 46 also may have a cavity 74 within the female portion 72 to accommodate trapped air. Again, one or both of the cavities 54 and 74 may have a structure and dimensions to render the trapped air innocuous to the design and function of the multi-component worm shaft 20. The assembled multi-component worm shaft 20 may be used in any desired mechanical device or system, such as system 10 illustrated by FIG. 1. Accordingly, the multi-component worm shaft 20 may have a plurality of bearing and seal assemblies, such as bearings 76 and 78 and seal 80, to facilitate a sealed rotation of the worm shaft 20 within the desired device or system. The multi-component worm shaft 20 also may have the coupling 16 disposed about the male coupling structure 56. The coupling 16 is interlocked with the male coupling structure 56 via a key structure 82, which is inserted into the key slot 58 and an adjacent key slot 84 disposed within a female coupling structure 86 of the coupling 16.

The multi-component worm shaft 20 illustrated by FIG. 5 has the modular extension structure 46 coupled to both modular assembly ends 44 and 70 of the thread section 32. As discussed above, this coupling may be achieved by placing the female portion 72 of the modular extension structures 46 about the modular assembly ends 44 and 70 in an interference fit, such as by pressing or shrink-fitting the modular extension ends 46 onto the modular assembly ends 44 and 70. Moreover, the thread section 32 has cavity 54 in the modular assembly end 44 and a cavity 88 in the modular assembly end 70 to render air trapped between the female portion 72 and the modular assembly ends 44 and 70 innocuous to the design and function of the multi-component worm shaft 20. Again, the modular extension structures 46 also may have the cavity 74 within the female portion 72 to accommodate trapped air. The assembled multi-component worm shaft 20 may have a plurality of bearing and seal assemblies, such as bearings 90 and 92 and seals 94 and 96, to facilitate a sealed rotation of the worm shaft 20 within the desired device or system. The multi-component worm shaft 20 also may have couplings 16 disposed about the male coupling structure 56 of the modular extension ends 46. Again, the coupling 16 is interlocked with the male coupling structure 56 via the key structure 82, which is inserted into the key slot 58 and the adjacent key slot 84 within the female coupling structure 86.

The multi-component worm shaft 20 illustrated by FIG. 6 has the modular extension structure 50 coupled to the modular assembly end 44 of the thread section 32. Again, the foregoing coupling may be achieved by placing a female portion 98 of the modular extension structure 50 about the modular assembly end 44 in an interference fit, such as by pressing or shrink-fitting the modular extension end 50 onto the modular assembly end 44. As discussed above, the multi-component worm shaft 20 may have a plurality of bearing and seal assemblies, such as bearings 100 and 102 and seal 104, to facilitate a sealed rotation of the worm shaft 20 within the desired device or system. The multi-component worm shaft 20 also may have a male coupling structure or the shaft 20 may directly mate with a shaft of another device, such as the motor 14 illustrated by FIG. 1.

Figure 7:
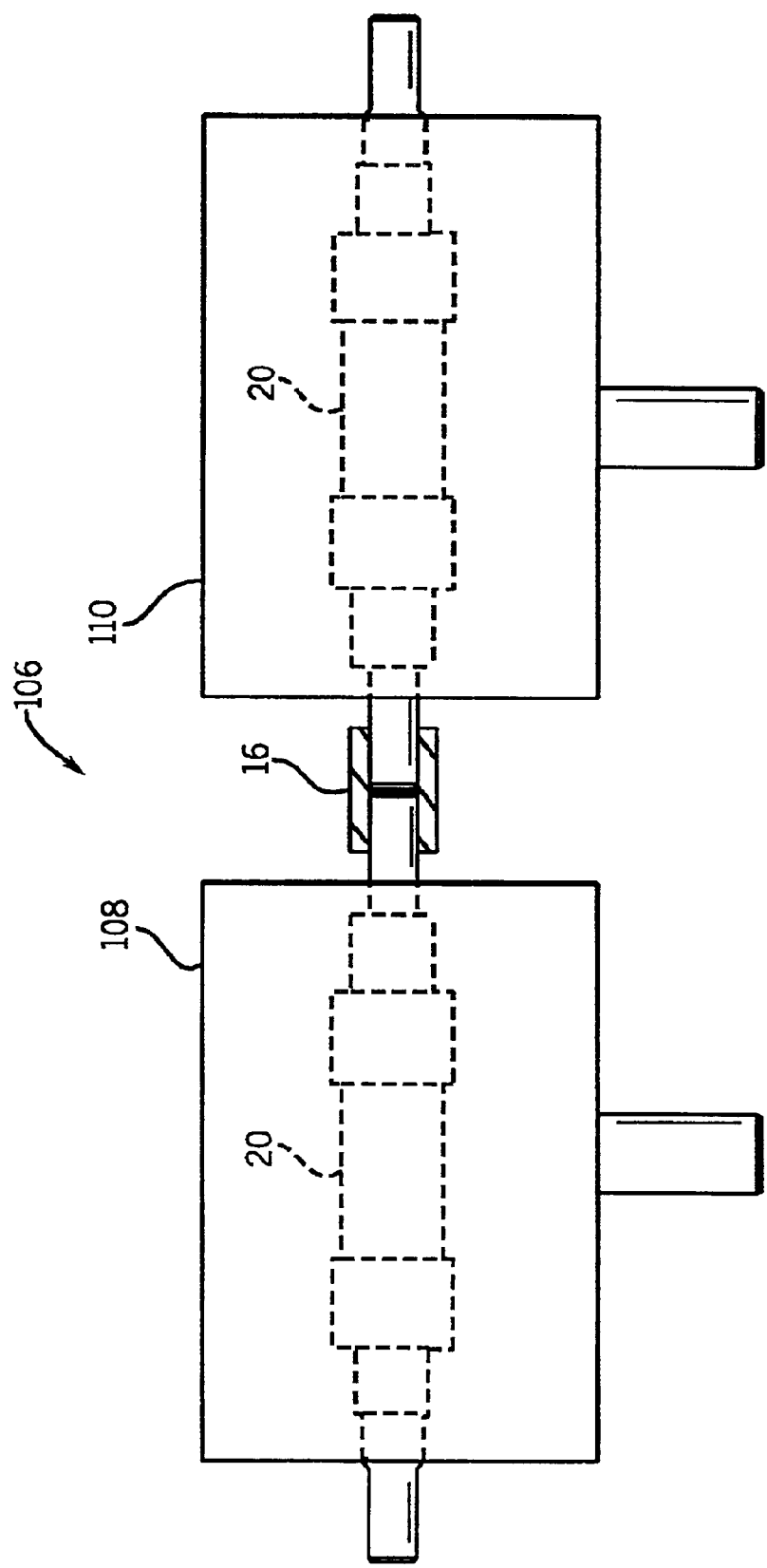
FIG. 7 is a side view of a system having a pair of multi-component worm shafts coupled in series between adjacent devices.

The foregoing multi-component worm shaft 20 is applicable in a wide variety of applications having different gearing requirements, different load requirements, and different end requirements. For example, a plurality of the multi-component worm shafts 20 may be used in series or in parallel in one or more mechanical devices or systems. FIG. 7 illustrates an exemplary system 106 having a pair of the multi-component worm shafts 20 disposed in series between adjacent devices 108 and 110. Any other suitable configuration is also within the scope of the present technique.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A modular gearing system, comprising:
   a worm shaft having worm threads mateable with a worm gear; and
   a modular extension having first and second couplings, wherein the first coupling is coupled to an end structure of the worm shaft, the second coupling is configured to couple to a device other than the worm shaft, and the modular extension is selective from a plurality of modular extensions.

2. The modular gearing system of claim 1, wherein the modular extension or the end structure comprises a recess structure defining a chamber at a mating interface between the modular extension and the end structure.

3. The modular gearing system of claim 1, wherein the plurality of modular extensions comprise a plurality of modular worm shaft extensions having a standard structure with different dimensions.

4. The modular gearing system of claim 1, wherein the plurality of modular extensions comprise a plurality of modular worm shaft extensions having different extension structures for the worm shaft.

5. The modular gearing system of claim 1, wherein the second coupling comprises a male coupling structure.

6. The modular gearing system of claim 1, wherein the second coupling comprises a female coupling structure.

7. The modular gearing system of claim 1, wherein the second coupling comprises a gear structure.

8. The modular gearing system of claim 1, wherein the modular extension is shrink fit onto the end structure of the worm shaft.

9. The modular gearing system of claim 1, wherein the modular extension is interference fit with the end structure of the worm shaft.

10. The modular gearing system of claim 1, comprising another modular extension coupled to an end of the worm shaft opposite the end structure, wherein the modular extension is selective from the plurality of modular extensions.

11. The modular gearing system of claim 1, comprising another threaded worm shaft and worm gear assembly coupled to a desired end of the worm shaft.

12. The modular gearing system of claim 1, comprising a bearing assembly disposed about the modular extension.

13. A gear, comprising:
    a worm shaft comprising an intermediate worm thread section between first and second end structures, wherein the first end structure has a recess structure and a male or female coupling structure for a desired extension of a plurality of modular worm shaft extensions.

14. The gear of claim 13, wherein the recess structure is adapted to reduce pressure buildup from an assembly of the worm shaft and the desired extension.

15. The gear of claim 13, wherein the coupling structure comprises an interference fit structure coupleable with a mating interference fit structure of the desired extension.

16. A gearing mechanism, comprising:
    a modular worm shaft extension having first and second couplings, wherein the first coupling is coupleable to an end structure of a worm shaft having worm threads mateable with a worm gear and the second coupling is coupleable to a device other than the worm shaft, and wherein the modular worm shaft extension is selective from a plurality of different modular worm shaft extensions.

17. The gearing mechanism of claim 16, wherein the modular worm shaft extension comprises a recess structure adapted to reduce pressure buildup from an interference-fit assembly of the worm shaft and the modular worm shaft extension.

18. The gearing mechanism of claim 16, wherein the second coupling comprises a male coupling structure.

19. The gearing mechanism of claim 16, wherein the second coupling comprises a female coupling structure.

20. The gearing mechanism of claim 16, wherein the second coupling comprises a gear structure.

21. The gearing mechanism of claim 16, wherein the modular worm shaft extension comprises an interference fit structure coupleable with a mating interference fit structure of the end structure.

22. The gearing mechanism of claim 16, wherein the modular worm shaft extension comprises a shrink fit structure coupleable with a mating shrink fit structure of the end structure.

23. The gearing mechanism of claim 16, wherein the modular worm shaft extension comprises a bearing interface structure.

24. A method of forming a worm shaft, comprising:
    providing a worm shaft having worm threads mateable with a worm gear;
    selecting a worm shaft extension for the worm shaft from a plurality of modular worm shaft extensions, the worm shaft extension having first and second couplings, wherein the first coupling is configured to couple to an end of the worm shaft and the second coupling is configured to couple to a device other than the worm shaft; and
    coupling the worm shaft extension to the end of the worm shaft.

25. The method of claim 24, wherein the act of providing the worm shaft comprises the act of selecting a desired gear ratio for the worm shaft.

26. The method of claim 24, wherein the act of providing the worm shaft comprises the act of forming a standard worm shaft having desired gearing characteristics.

27. The method of claim 24, wherein the act of selecting the worm shaft extension comprises the act of choosing the second coupling having a desired male coupling.

28. The method of claim 24, wherein the act of selecting the worm shaft extension comprises the act of choosing the second coupling having a desired female coupling.

29. The method of claim 24, wherein the act of selecting the worm shaft extension comprises the act of choosing the second coupling having a desired gear.

30. The method of claim 24, wherein the act of coupling the worm shaft extension to the end of the worm shaft comprises the act of interference fitting the worm shaft extension with the end of the worm shaft.

31. The method of claim 24, wherein the act of coupling the worm shaft extension to the end of the worm shaft comprises the act of press fitting the worm shaft extension onto the end of the worm shaft.

32. The method of claim 24, wherein the act of coupling the worm shaft extension to the end of the worm shaft comprises the act of shrink fitting the worm shaft extension with the end of the worm shaft.

33. The method of claim 32, wherein the act of shrink fitting comprises the acts of:

heating the worm shaft extension;

engaging the worm shaft extension with the end of the worm shaft; and cooling the worm shaft extension to shrink the worm shaft extension onto the end.

34. The method of claim 24, wherein the act of coupling the worm shaft extension to the end of the worm shaft comprises the act of reducing air pressure buildup between the worm shaft extension and the worm shaft.

35. The method of claim 34, wherein the act of reducing air pressure buildup comprises the act of accommodating air in an air expansion chamber at an interface between the worm shaft extension and the end of the worm shaft.

36. The method of claim 24, wherein the act of coupling the worm shaft extension to the end of the worm shaft comprises the act of removably coupling the worm shaft extension to the end of the worm shaft.

37. The method of claim 24, further comprising the act of reconfiguring the coupling of the worm shaft and the worm shaft extension.

38. The method of claim 24, further comprising the acts of:

removing the worm shaft extension from the end of the worm shaft;

selecting a different extension from the plurality of modular worm shaft extensions; and attaching the different extension to the end of the worm shaft.

39. The method of claim 24, further comprising the acts of:

removing the worm shaft extension from the end of the worm shaft;

selecting a different worm shaft from a plurality of modular worm shafts having different characteristics; and attaching the worm shaft extension to the end of the different worm shaft.

40. The method of claim 24, further comprising the acts of:

picking an additional worm shaft extension for the worm shaft from the plurality of modular worm shaft extensions; and connecting the additional worm shaft extension to the worm shaft opposite the worm shaft extension.

41. A modular worm gearing system, comprising:

a threaded worm shaft selectable from a plurality of modular worm shaft sections;

a worm shaft extension selectable from a plurality of modular worm shaft extensions;

means for coupling the threaded worm shaft and the worm shaft extension; and means for coupling the worm shaft extension to a device other than the threaded worm shaft.

* * * * *